United States Patent [19]

Iwata et al.

[11] Patent Number: 5,167,813
[45] Date of Patent: Dec. 1, 1992

[54] APPARATUS FOR PRODUCING A FUNCTIONALLY GRADIENT MATERIAL

[75] Inventors: Masashi Iwata, Nagoya, Japan; Won-Deok Yi, Busan, Rep. of Korea; Niichi Hayashi, Hashima, Japan; Shigeo Watanabe, Gifu, Japan; Norio Ota, Nagoya, Japan

[73] Assignee: Kabushiki Kaisha Nagao Kogyo, Nagoya, Japan

[21] Appl. No.: 558,478

[22] Filed: Jul. 27, 1990

[30] Foreign Application Priority Data

Jul. 28, 1989 [JP] Japan ................... 1-197065

[51] Int. Cl.⁵ .......................... B01D 29/075
[52] U.S. Cl. ................... 210/219; 210/143; 210/252; 210/259; 210/319; 210/359; 210/406; 210/407; 210/416.1; 264/86; 264/87; 425/145
[58] Field of Search .............. 210/767, 770, 778, 800, 210/804, 143, 193, 219, 252, 259, 314, 319, 359, 398, 406, 407, 413, 416.1, 523; 118/415; 427/189, 190, 201, 203; 264/86, 87; 425/84, 85, 141, 145

[56] References Cited

U.S. PATENT DOCUMENTS

| | | | |
|---|---|---|---|
| 619,838 | 2/1899 | Potter | 210/193 |
| 3,235,492 | 2/1966 | Andresen et al. | 210/778 |
| 3,594,273 | 7/1971 | Williams | 264/87 |
| 3,736,159 | 5/1973 | Gibson et al. | 264/87 |
| 4,204,907 | 5/1980 | Korklan et al. | 264/87 |
| 4,798,694 | 1/1989 | Sugata et al. | 264/86 |
| 4,836,875 | 6/1989 | Buttermore et al. | 264/87 |

Primary Examiner—Robert A. Dawson
Assistant Examiner—Sun Uk Kim
Attorney, Agent, or Firm—Oblon, Spivak, McClelland, Maier & Neustadt

[57] ABSTRACT

Disclosed are a process for laminating a functionally gradient material and a laminating apparatus for the same. The process therefor includes a suspending step and a functionally gradient material laminating step. In the functionally gradient material laminating step, solid-liquid separation is carried out to a suspension while varying the mixing rates of the suspension particles contained therein continuously or in a multi-staged stepwise manner. Therefore, the functionally gradient material layer thus laminated offers a composition gradient varying continuously or in a multi-staged stepwise manner in the thicknesswise direction thereof in a superior continuity, and the composition fluctuates less in the planewise direction thereof. In addition, the process and the laminating apparatus have obviated the atomizing and the spraying which adversely affect a working environment.

6 Claims, 12 Drawing Sheets

| | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
| SLURRY A | ON | | | | | | | | | | |
| SLURRY B | | ON | | | | | | | | | |
| SLURRY C | | | ON | | | | | | | | |
| SLURRY D | | | | ON | | | | | | | |
| SLURRY E | | | | | ON | | | | | | |
| SLURRY F | | | | | | ON | | | | | |
| SLURRY G | | | | | | | ON | | | | |
| SLURRY H | | | | | | | | ON | | | |
| SLURRY I | | | | | | | | | ON | | |
| SLURRY J | | | | | | | | | | ON | |

TIME "t" ⟶

5,167,813

APPARATUS FOR PRODUCING A FUNCTIONALLY GRADIENT MATERIAL

BACKGROUND OF THE INVENTION

1. Field of the Invention

The present invention relates to a process for laminating a functionally gradient material having a composition which is superior in the composition gradient continuity in the thicknesswise direction thereof and in the composition uniformity in the planewise direction thereof, and a laminating apparatus for carrying out the process.

The present invention also relates to a process for laminating a functionally gradient material having a composition gradient superior in the composition uniformity in the planewise direction thereof while maintaining the composition gradient in the thicknesswise direction thereof, and a laminating apparatus for carrying out the process.

2. Description of the Prior Art

Several production processes, for instance a vacuum laminating technology such a CVD method and a PVD method, and a powder spraying technology in which powders are sprayed and laminated one after another, have been proposed so far for producing functionally gradient materials having composition gradients, in which the compositions, i.e., the mixing rates of a plurality of suspension particle components, vary continuously in the thicknesswise direction thereof.

In the powder spraying technology, the raw material powders are sprayed or atomized by a nozzle moving relatively in the X-direction and the Y-direction over a plane to be laminated while varying the mixing rates.

In the production processes for producing functionally gradient materials employing the vacuum laminating technology, it is appropriate for laminating a film in the order of thickness in micrometers. However, it is not practical to laminate a film having a thickness greater than micrometers because it takes much time to laminate such a film by the vacuum laminating technology.

On the contrary, the production processes for producing functionally gradient materials employing the powder spraying technology offer faster laminating rates than that of the vacuum laminating technology. However, it has the following disadvantages:

First, the surroundings are polluted by the raw material powders because the raw material powders are sprayed or atomized, and the working environment is deteriorated.

Second, the operation efficiency is poor and the compositions fluctuate in the planewise direction because the spraying nozzle moves relatively in the X-direction and the Y-direction over the plane to be laminated.

SUMMARY OF THE INVENTION

The present invention has been developed in view of the above-mentioned problems of the prior art technologies.

It is therefore an object of the present invention to provide a process for laminating a functionally gradient material which is superior in the composition gradient continuity in the thicknesswise direction thereof and in the composition uniformity in the planewise direction thereof, thereby solving the problems of the prior art technologies.

Further, it is therefore further object of the present invention to provide a process for laminating a functionally gradient material having a composition gradient superior in the composition uniformity in the planewise direction thereof while maintaining the composition gradient in the thicknesswise direction thereof, thereby solving the problems of the prior art technologies.

The above-mentioned object is carried out by one aspect of a process for laminating a functionally gradient material according to the present invention. The process therefor comprises the steps of: a suspending step of preparing a suspension in which a plurality of suspension particles are suspended and varying the mixing rates of said suspension particles continuously in said suspension; and a functionally gradient material laminating step of carrying out solid-liquid separation to said suspension, thereby forming a functionally gradient material layer having a composition varying in the laminating direction continuously.

The above-mentioned further object is carried out by another aspect of a process for laminating a functionally gradient material according to the present invention. The process therefor comprises the steps of: a suspending step of preparing a plurality of suspensions in which a plurality of suspension particles are suspended in mixing rates being different from each other; and a functionally gradient material laminating step of mixing the plurality of suspensions in order depending on the mixing rates, and thereafter carrying out solid-liquid separation to said suspension, thereby forming a functionally gradient material layer having a composition varying in the laminating direction in a multi-staged stepwise manner.

As for the method for carrying out the solid-liquid separation, the following may be employed: a filtration method, a slip casting method, an electrophoresis method, a centrifugal separation method and the like.

In the above-mentioned processes therefor according to the present invention, the solid-liquid separation is carried out to the suspension while varying the mixing rates of the suspension particles in the suspension continuously or in a multi-staged stepwise manner, thereby laminating the functionally gradient material layer. Hence, the processes consequently have effected the following advantages:

First, it is possible to laminate a functionally gradient material in which the composition fluctuates less in the planewise direction thereof and the composition gradient is superior in the continuity in the thicknesswise direction thereof.

Second, it is possible to laminate a functionally gradient material having a superior composition uniformity in the planewise direction thereof while maintaining a composition gradient in the thicknesswise direction thereof.

Third, it is possible to prevent the working environment from deteriorating because the processes do not depend on the atomizing and the spraying.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS OF THE PRESENT INVENTION

Having generally described the present invention, a further understanding can be obtained by reference to certain specific preferred embodiments which are provided herein for purposes of illustration only and are not intended to be limiting unless otherwise specified.

FIRST PREFERRED EMBODIMENT

Figure 1:
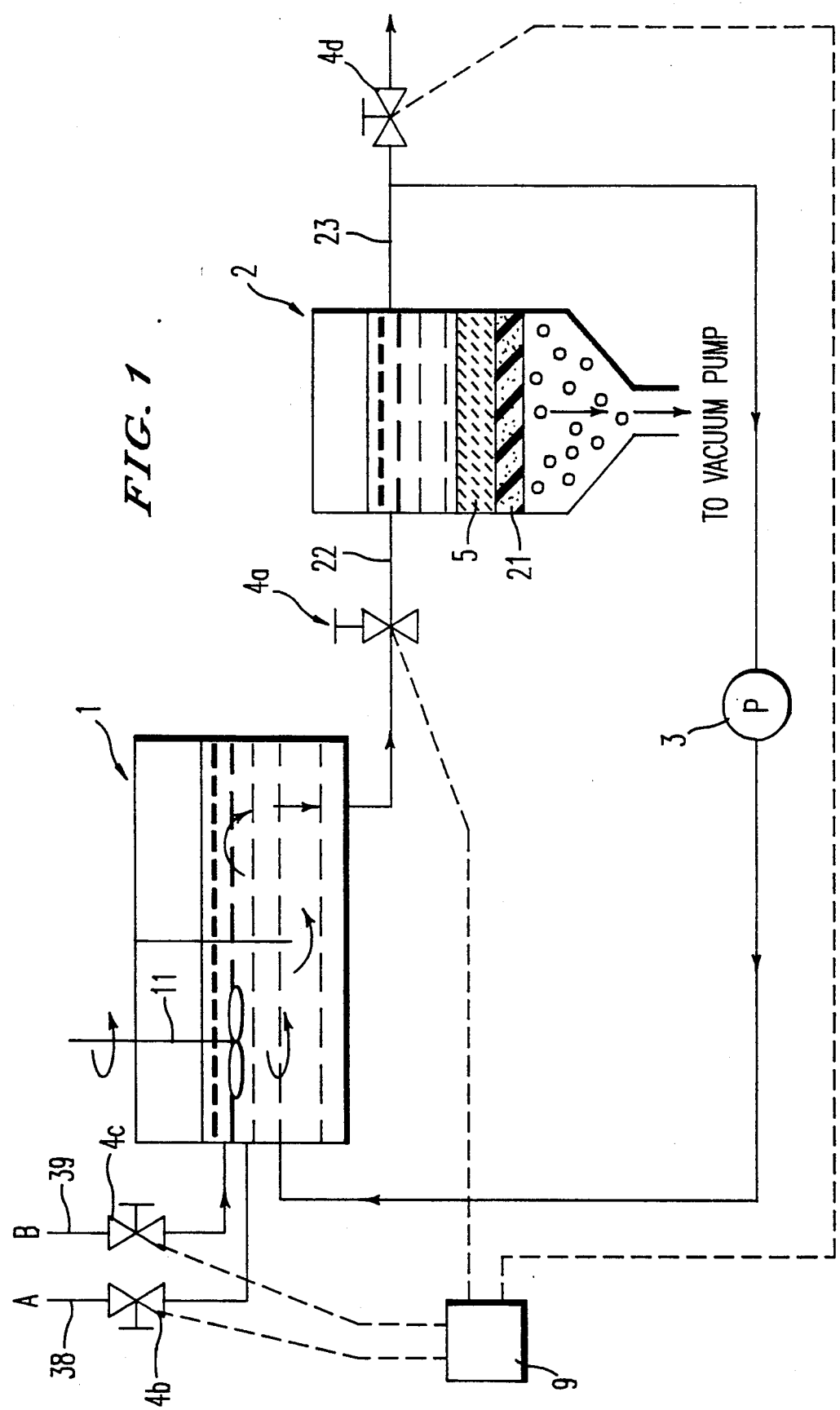
FIG. 1 is a schematic illustration of an example of a laminating apparatus for carrying out a process for laminating a functionally gradient material of a first preferred embodiment according to the present invention.

A laminating apparatus incorporating a process for laminating a functionally gradient material layer of the first preferred embodiment according to the present invention will be hereinafter described with reference to FIG. 1. The laminating apparatus comprises a stirring and mixing bath 1 (a mixing means according to the present invention), a filtering bath 2 (a solid-liquid separating means according to the present invention), a circulating pump 3, opening-closing valves 4a, 4b, 4c and 4d (a supply controlling means according to the present invention) and a control device 9 (a supply controlling means according to the present invention).

The stirring and mixing bath 1 is connected to pipes 38 and 39 for supplying a slurry "A" and a slurry "B". The slurry "A" and the slurry "B" are supplied into the stirring and mixing bath 1 by gravity from stirring baths (not shown) for preparing the slurry "A" and the slurry "B" by way of the pipes 38 and 39.

The slurry "A" and the slurry "B" supplied into the stirring and mixing bath 1 are fully stirred and mixed, and made into a mixed slurry having a predetermined mixing rate. Then, the mixed slurry is delivered to the filtering bath 2 by way of the opening-closing valve 4a.

At the middle portion of the filtering bath 2, a filter member 21 having a predetermined thickness is disposed horizontally therein. At the top portion of the filtering bath 2, a mixed slurry introducing pipe 22 and a mixed slurry discharging pipe 23 are connected. Further, the bottom portion of the filtering bath 2 is connected to an inlet port of a vacuum pump (not shown).

Here, the slurry "A" comprises silicon carbide (hereinafter simply referred to as SiC) powder having an average diameter of approximately 2 $\mu$m and suspended in water, and the slurry "B" comprises titanium (hereinafter simply referred to as Ti) powder having an average diameter of approximately 40 $\mu$m and suspended in water. The concentrations of the slurry "A" and the slurry "B" are determined as the case requires.

The control device 9 comprises a microcomputer, and controls the opening and closing of the opening-closing valves 4a, 4b, 4c and 4d, thereby controlling the flow rates of the mixed slurry, the slurry "A" and the slurry "B". Here, the opening-closing valve 4b turns the supply of the slurry "A" into the mixing and stirring bath 1 on and off, the opening-closing valve 4c turns the supply of the slurry "B" into the mixing and stirring bath 1 on and off, and the opening-closing valve 4d turns the discharge of the mixed slurry from the filtering bath 2 to the external outlet port on and off. The circulating pump 3 is disposed between the stirring and mixing bath 1 and the filtering bath 2 in order to circulate the mixed slurry, thereby homogenizing the slurry in the stirring and mixing bath 1 and the slurry in the filtering bath 2.

Figure 2:
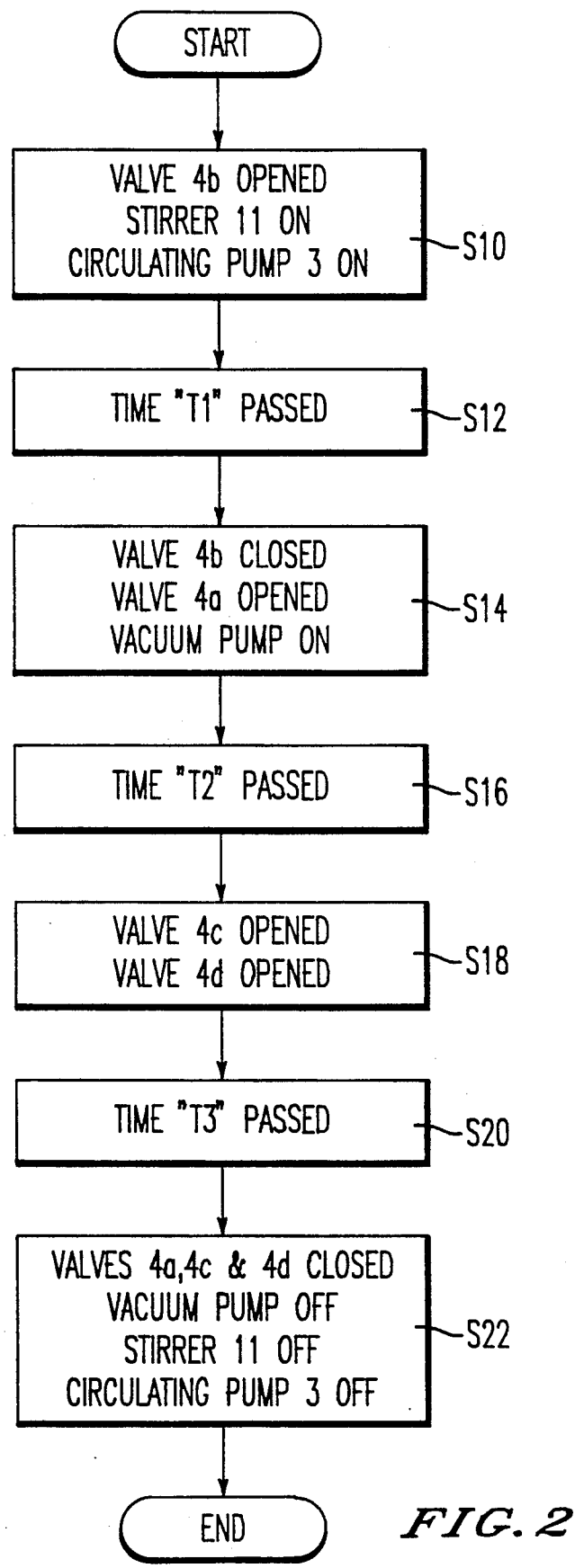
FIG. 2 is a flow chart for describing the operation of the laminating apparatus illustrated in FIG. 1.

A process for laminating a functionally gradient material layer according to the present invention, in which the laminating apparatus thus arranged was employed, will be hereinafter described with reference to the flow chart illustrated in FIG. 2.

At step "S10", the opening-closing valve 4b was opened to supply the slurry "A" into the mixing and stirring bath 1, and a stirrer 11 and the circulating pump 3 were turned on.

At step "S14", namely after a predetermined time "T1" had passed (step "S12"), the opening-closing valve 4b was closed, and the opening-closing valve 4a was opened to introduce the slurry "A" into the filtering bath 2 by a predetermined flow rate, and simultaneously the vacuum pump (not shown) was turned on.

Thus, the SiC powder in the slurry "A" which was introduced into the filtering bath 2 was sedimented and aggregated on the top surface of the filter member 21 by gravity and by the dehydration action of the vacuum pump (not shown).

At step "S18", namely after a predetermined time "T2" had passed (step "S16") or the SiC powder layer sedimented and aggregated on the top surface of the filter member 21 was assumed to reach a predetermined thickness approximately, the opening-closing valve 4c was opened to supply the slurry "B" continuously into the stirring and mixing bath 1 by a predetermined flow rate, and simultaneously the valve 4d was opened to discharge the mixed slurry from the filtering bath 2 by a predetermined flow rate.

As a result, the slurry "A" and the slurry "B" in the stirring and mixing bath 1 were fully stirred by the stirrer 11, the mixing rate of the slurry "B" contained in the mixed slurry was increased continuously in the stirring and mixing bath 1, the filtering bath 2 and the pipes 22 and 23, and the mixing rate reached 100% substantially after a predetermined time had passed. Accordingly, a mixed layer whose composition varied continuously was laminated on the SiC powder layer sedimented and aggregated on the top surface of the filter member 21, thereby making a cake 5.

At step "S22", namely after a predetermined time "T3" had passed (step "S20"), the opening-closing valves 4a, 4c and 4d were closed, and the stirrer 11 and the circulating pump 3 were turned off to dehydrate the mixed slurry remaining in the filtering bath 2. Thereafter, the vacuum pump (not shown) was turned off to take out the cake 5.

Figure 3:
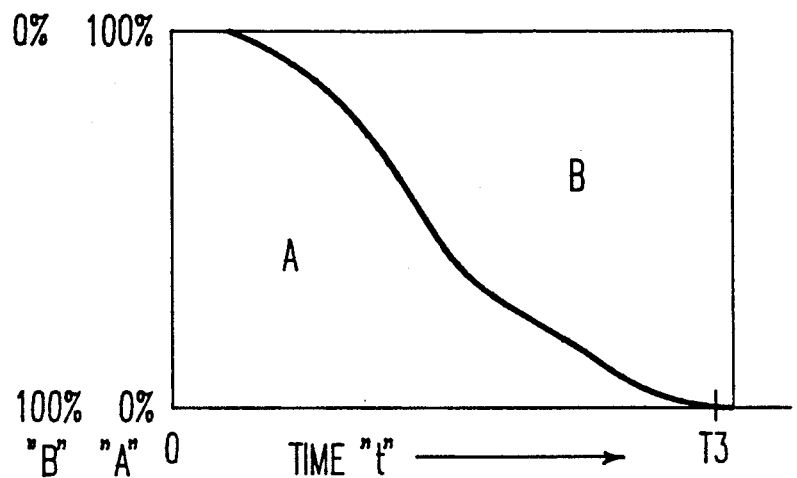
FIG. 3 is a diagram of a composition variation in a slurry in a filtering bath 2 of the laminating apparatus illustrated in FIG. 1.
Figure 4:
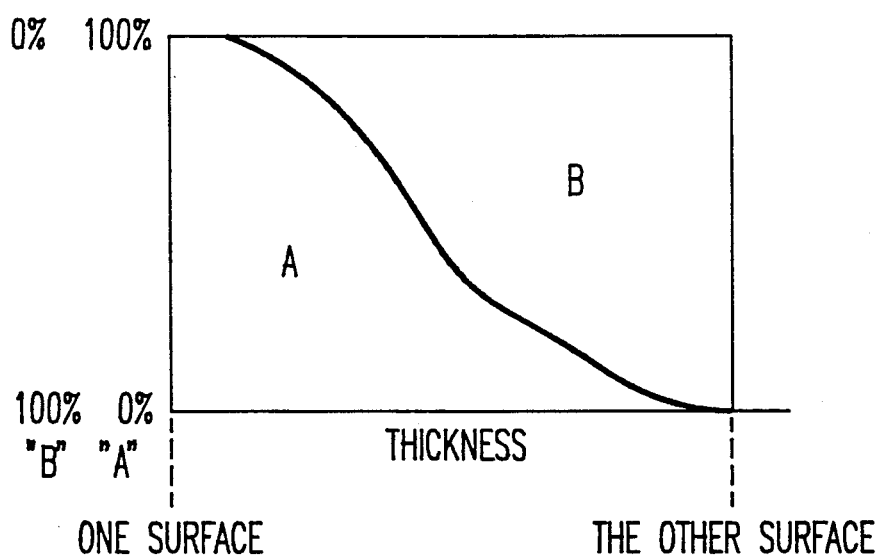
FIG. 4 is a diagram of a composition variation in a cake in the thicknesswise direction thereof laminated by the process for laminating a functionally gradient material of the first preferred embodiment according to the present invention.

FIG. 3 illustrates how the composition of the mixed slurry in the filtering bath 2 varied as time passed. FIG. 4 illustrates the composition variation of the cake 5 in the thicknesswise direction thereof.

Finally, the cake 5 taken out of the filtering bath 2 is further dehydrated by compression, and thereafter molded into a predetermined shape, dried and sintered.

Figure 5:
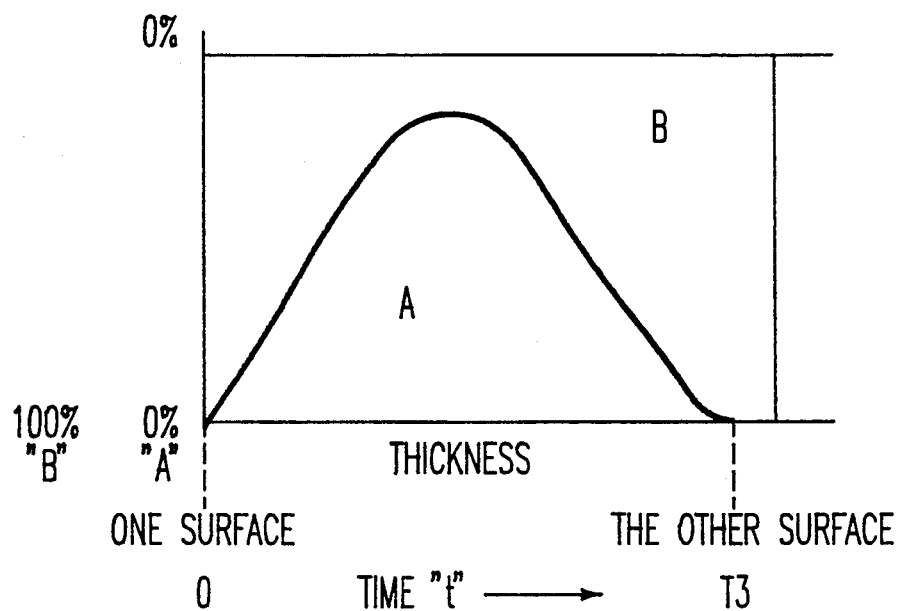
FIG. 5 is a diagram of a composition variation in a cake in the thicknesswise direction thereof laminated by the process therefor of the first preferred embodiment according to the present invention.
Figure 6:
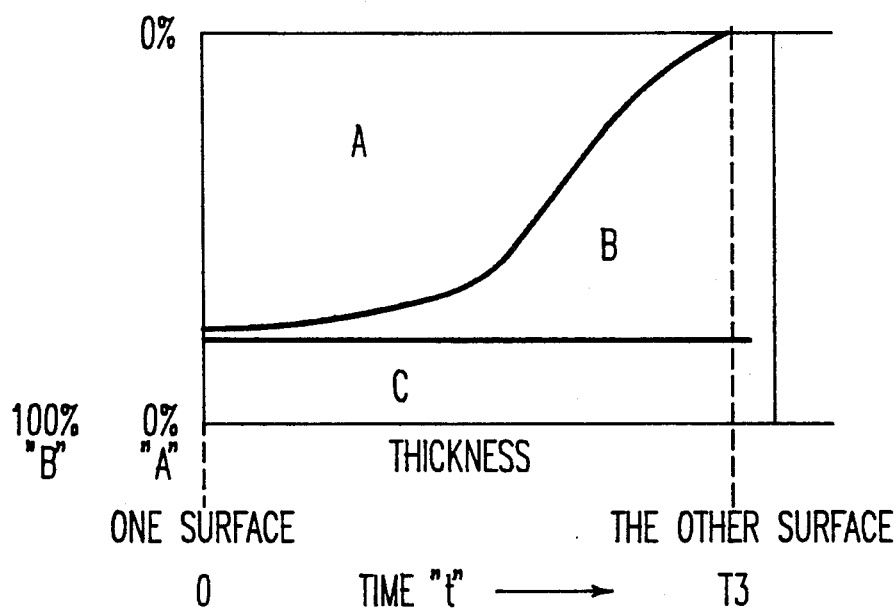
FIG. 6 is a diagram of a composition variation in a cake in the thicknesswise direction thereof laminated by the process therefor of the first preferred embodiment according to the present invention.

When the filtration type laminating apparatus described in the first preferred embodiment is employed, a functional gradient material layer having a hill-shaped composition variation as illustrated in FIG. 5 can be obtained by controlling the supply flow rates of the slurry "A" and the slurry "B" into the stirring and mixing bath 1, the discharge flow rate of the mixed slurry flowing out of the filtering bath 2, and the sedimentation and aggregation rates of the mixed slurry in the filtering bath 2. In addition, as illustrated in FIG. 6, the mixing rate of the component "C" can be kept constant in a functionally gradient material layer having a three-component system while varying the mixing rates or the compositions of the other two components "A" and "B".

A modified embodiment of the laminating apparatus employed in the process for laminating a functionally gradient material layer according to the first preferred embodiment will be hereinafter described.

Namely, as for the filtering bath 2, not only the above-mentioned suction and filtration type filtering bath in which the vacuum pump is employed, but also a pressure filtration type filtering bath, a centrifugal filtration type filtering bath, a compression separation type filtering bath, an electrophoresis type filtering bath and the like may be employed naturally. The filter member 21 may be formed in a desired product shape as the case requires.

Moreover, the dispersion medium is not limited to water, but other organic solvents may be employed therefor. The suspension particles may have a form other than a particle, for instance, they may have a whisker-like shape.

SECOND PREFERRED EMBODIMENT

Figure 7:
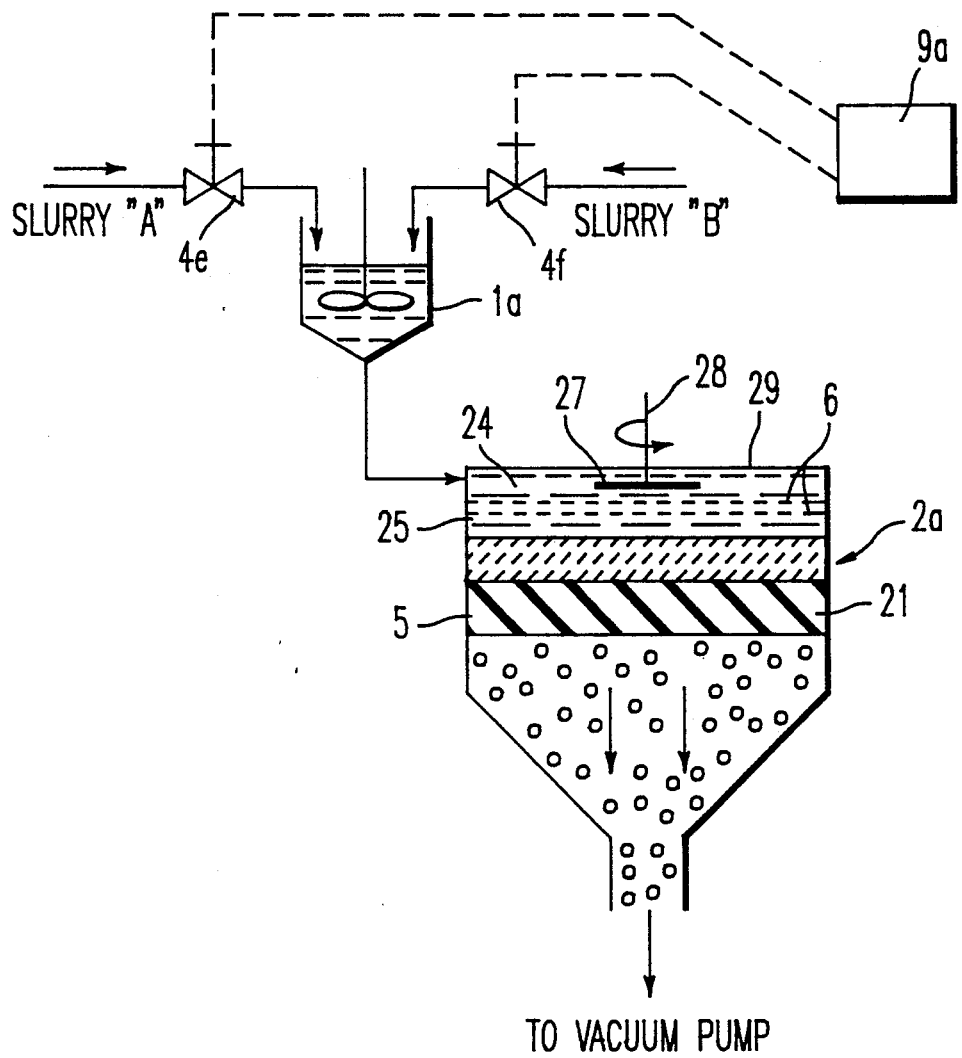
FIG. 7 is a schematic illustration of an example of a laminating apparatus for carrying out a process therefor of a second preferred embodiment according to the present invention.

Another laminating apparatus incorporating a process for laminating a functionally gradient material layer of the second preferred embodiment according to the present invention will be hereinafter described with reference to FIG. 7. The laminating apparatus comprises a stirring and mixing bath 1a (a mixing means according to the present invention), a filtering bath 2a (a solid-liquid separating means according to the present invention), opening-closing valves 4e and 4f (a supply controlling means according to the present invention), and a microcomputer control device 9a (a supply controlling means according to the present invention) for controlling the opening-closing valves 4e and 4f.

The slurry holding capacities of the stirring and mixing bath 1a and the filtering bath 2a are made as small as possible, and especially the slurry holding capacity of the stirring and mixing bath 1a is made much smaller than that of the filtering bath 2a.

An opening at the top of the filtering bath 2a is covered with a cover member 29 in a water-proof manner. At the central portion of the cover member 29, a rotary shaft 28 of a rotary disk 27 is rotatably held. The rotary disk 27 rotates at a slow speed of approximately 60 rpm to stir the mixed slurry, thereby homogenizing the concentration of the mixed slurry.

Within the filtering bath 2a, a space above a filter member 21 is filled with the mixed slurry having a predetermined composition, and two fluid resistance nets 6 are disposed between the rotary disk 27 and the filter member 21 in a manner parallel to the filter member 21 or in the horizontal direction. Namely, the fluid resistance nets 6 divide the inner space 24 of the filtering bath 2a filled with the mixed slurry into an upper space 24 and a lower space 25.

The fluid resistance nets 6 are made of stainless steel, and the mesh size is larger than the average particle diameters of the suspension particles in the mixed slurry by a factor of several tens approximately. Accordingly, the suspension particles in the mixed slurry can pass the fluid resistance nets 6 freely. However, the rotary flow of the mixed slurry generated by the rotary disk 27 in the upper space 24 is obstructed by the fluid resistance nets 6, and it is hardly transmitted to the lower space 25. Hence, the surface of the cake 5 is hardly disturbed by the rotary flow of the mixed slurry.

Consequently, when a vacuum pump is turned on to perform suction, the water content in the lower space 25 is filtered and dehydrated by the filter member 21, thereby laminating a cake 5 having a predetermined composition on the filter member 21. Then, the mixed slurry is supplied from the upper space 24 to the lower space 25 gently by a flow rate equal to the dehydrated amount, and at the same time the mixed slurry having a new mixing rate is supplied from the stirring and mixing bath 1a to the upper space 24 by a flow rate equal to the flow rate from the upper space 24 to the lower space 25.

A process for laminating a functionally gradient material layer gradient according to the present invention will be hereinafter described in which the laminating apparatus thus arranged was employed.

At first, only the slurry "A" was supplied into the stirring and mixing bath 1a, and thereafter the slurry "A" was mixed with the slurry "B" gradually so as to make the mixed slurry having the compositions as illustrated in FIG. 3. The mixed slurry was than supplied into the filtering bath 2a, whereby the functionally gradient material layer having the composition as illustrated in FIG. 4 was obtained. According to the process of the second preferred embodiment, it is possible to save the slurry consumptions.

THIRD PREFERRED EMBODIMENT

Figure 8:
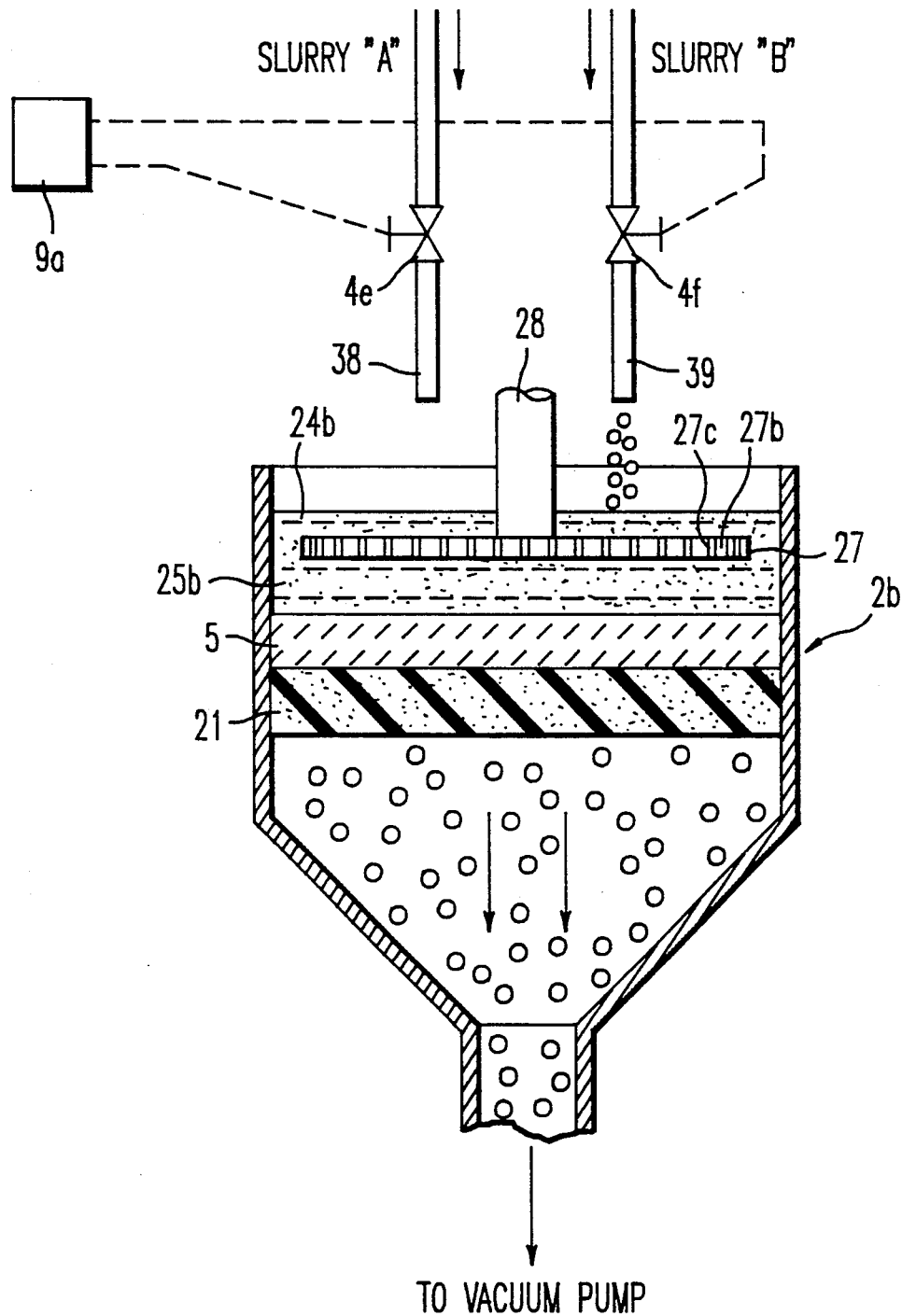
FIG. 8 is a schematic illustration of an example of a laminating apparatus for carrying out a process therefor of a third preferred embodiment according to the present invention.

Still another laminating apparatus incorporating a process for laminating a functionally gradient material layer of the third preferred embodiment according to the present invention will be hereinafter described with reference to FIG. 8. The laminating apparatus comprises a stirring-mixing-filtering bath 2b (a mixing means and a solid-liquid separating means according to the present invention), opening-closing valves 4e and 4f (a supply controlling means according to the present invention), and a microcomputer control device 9a (a supply controlling means according to the present invention) for controlling the opening-closing valves 4e and 4f.

The filtering bath 2b is opened at the top. Above a filter member 21, a perforated disk 27 is fixed on a rotary shaft 28, and is made rotatable. The perforated disk 27 rotates at a slow speed of approximately 60 rpm. Further, the diameter of the perforated disk 27 is designed to be equal to the inner diameter of the stirring-mixing-filtering bath 2b.

Namely, the mixed slurry above the cake 5 in the stirring-mixing-filtering bath 2b is divided into an upper space 24b and a lower space 25b by the perforated disk 27. In the perforated disk 27, a plurality of small diameter through holes 27c are drilled through in the vertical direction thereof. Accordingly, the mixed slurry in the upper space 24b is gently supplied to the lower space 25b by way of the small diameter through holes 27c only by the dehydrated content. Further, the perforated disk 27 rotates to stir the mixed slurry.

In this way, no disturbance occurs in the cake 5. This advantage results from the operation of the laminating apparatus in which the slurry "A" and the slurry "B" are supplied to the lower space 25b after they are mixed in the upper space 24b. The laminating apparatus operates similarly even when the stirring-mixing-filtering bath 2b is first filled with the slurry "A" supplied by way of the pipe 38, the opening-closing valve 4e is closed, and the opening-closing valve 4f is opened to directly supply the slurry "B" to the stirring-mixing-filtering bath 2b by way of the pipe 39. Therefore, the mixing baths 1 and 1a of the laminating apparatus according to the first and second preferred embodiments have been got rid of in the laminating apparatus according to the third preferred embodiment, and the slurry consumptions can be saved. Here, the upper space 24b constitutes the mixing means according to the present invention. It is natural that the fluid resistance nets 6 employed in the second preferred embodiment may be also employed in the third preferred embodiment.

The operation of the thus arranged laminating apparatus according to the third preferred embodiment will not be described hereinafter, since it is basically identical with that of the laminating apparatus according the second preferred embodiment. By the way, it is possible to obtain a functionally gradient material layer having a multi-staged stepwise composition gradient when the supply of the slurry "B" is carried out intermittently.

Figure 9:
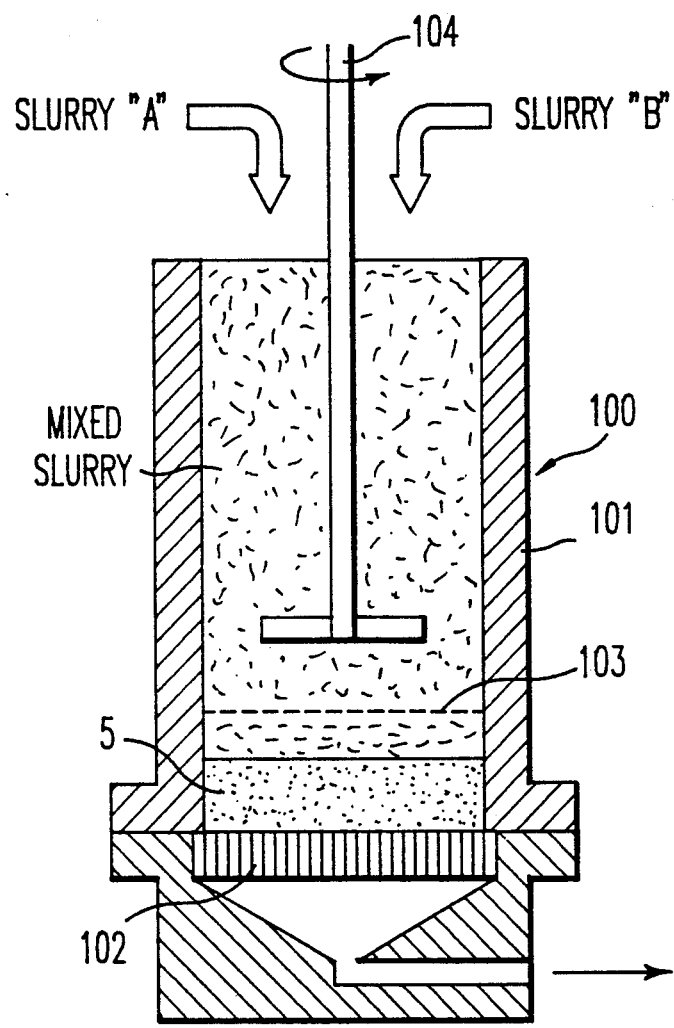
FIG. 9 is a cross sectional view of an experimental vacuum filtering apparatus for verifying a process therefor according to the present invention.

Additionally, the results of evaluation on a process for laminating a functionally gradient material layer according to the present invention will be hereinafter described. In the evaluation, an experimental vacuum filtering apparatus illustrated in FIG. 9 was employed.

The experimental vacuum filtering apparatus 100 has a cylindrical base 101 opened at the top, a filter member 102 disposed at the bottom of the cylindrical base 101, and a metal net 103 disposed above the filter member 102 for straightening the flow of the mixed slurry. Designated at 104 is a rotary shaft, and a disk is provided at the end thereof. The lowest bottom portion of the cylindrical base 101 is connected to a vacuum pump (not shown) which sucks the inside of the experimental vacuum filtering apparatus 100.

The cylindrical base 101 had the inner diameter of 6 cm and the height of 18 cm, and the pressure at the bottom of the filter member 102 was 2.8 KPa. Kaolin particles and ferric oxide particles were suspended in the slurry "A" and the slurry "B" respectively. At first, the slurry "A" (concentration: 30 g-Kaolin/350 ml-slurry) was filled into the experimental vacuum filtering apparatus 100. Thereafter, the slurry "B" (concentration: 10 g-$Fe_2O_3$/350 ml-slurry) was charged as the liquid level descended. The filtration was carried out for 3 to 5 hours.

Figure 10:
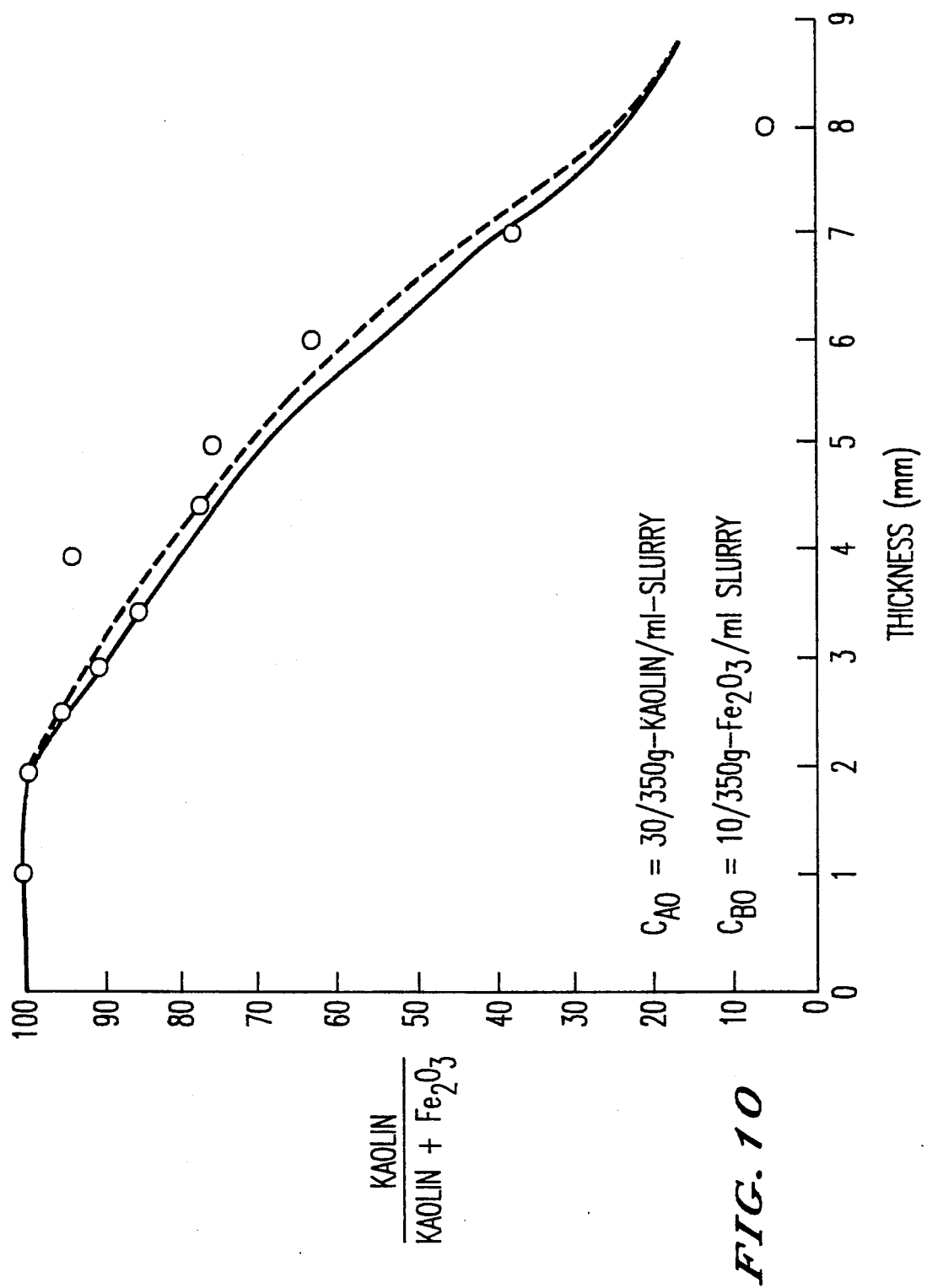
FIG. 10 is a characteristic diagram illustrating a cross sectional composition distribution of a functionally gradient material layer obtained with the experimental vacuum filtering apparatus illustrated in FIG. 9.

Next, the rotary shaft 104 was removed, and a compressing piston (not shown) was inserted into and descended in the cylindrical base 101 in order to compress a cake 5. The compressing pressure was 5 MPa, and the compression was carried out for 10 hours. Finally, the compressed cake 5 was taken out of the experimental vacuum filtering apparatus 100, and dried at the temperature of 100° C. The cross sectional composition of the dried cake 5 was examined with a fluorescent X-ray apparatus. As a result, it was found that the dried cake 5 had a superior continuity in the composition gradient as illustrated in FIG. 10.

FOURTH PREFERRED EMBODIMENT

Figure 11:
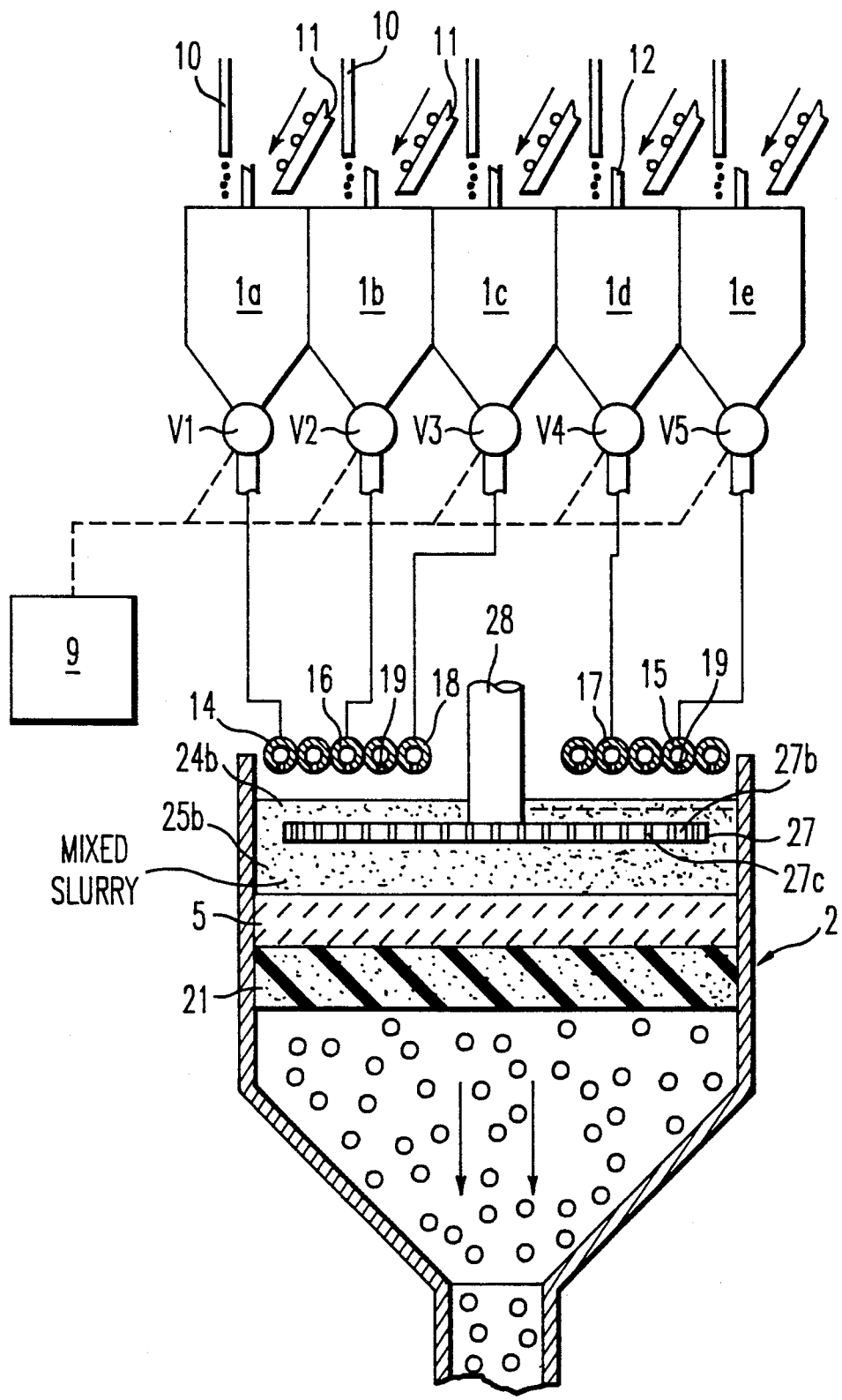
FIG. 11 is a schematic illustration of an example of a laminating apparatus for carrying out a process for laminating a functionally gradient material of a fourth preferred embodiment according to the present invention.

A laminating apparatus incorporating a process for laminating a functionally gradient material layer of the fourth preferred embodiment according to the present invention will be hereinafter described with reference to FIG. 11. The laminating apparatus comprises five slurry preparing baths 1a through 1e for preparing a suspension (hereinafter referred to as a slurry) having a predetermined composition, a stirring-mixing-filtering bath 2 (a mixing means and a solid-liquid separating means according to the present invention) for receiving a plurality of suspensions having different compositions from the slurry preparing baths 1a through 1e by predetermined flow rates in order thereby preparing as well as filtering a mixed suspension (hereinafter referred to as a mixed slurry), and a microcomputer control device 9 (a supply controlling means according to the present invention) for controlling the supply of the slurries from the slurry preparing baths 1a through 1e to the stirring-mixing-filtering bath 2.

All of the slurry preparing baths 1a through 1e have a funnel shape, and, above the slurry preparing baths 1a through 1e, pipes 10 and chutes 11 are disposed in order to supply water and raw material powders thereinto. A stirrer 12 for stirring the slurry is rotatably installed in the slurry preparing baths 1a through 1e respectively, and opening-closing valves V1 through V5 are disposed at the bottom of the slurry preparing baths 1a through 1b respectively.

The stirring-mixing-filtering bath 2 has a funnel shape opened at the top end and the bottom end thereof. The bottom opening thereof is connected to an inlet port of a vacuum pump (not shown). At the middle portion of the stirring-mixing-filtering bath 2, a filter member 21 is disposed horizontally so as to divide the inside of the stirring-mixing-filtering bath 2 into two sections vertically. Further, a rotary shaft 28 is disposed rotatably in the stirring-mixing-filtering bath 2, and is extended from the top to the bottom therein vertically. At the bottom end of the rotary shaft 28, a perforated disk 27b is disposed horizontally above the filter member 21. The diameter of the perforated disk 27b is designed so that it is equal to the inner diameter of the stirring-mixing-filtering bath 2. Accordingly, the space above the filter member 21 in the stirring-mixing-filtering bath 2 is divided into an upper space 24b and a lower space 25b by the perforated disk 27b. In the perforated disk 27b, a plurality of small diameter through holes 27c are drilled through in the vertical direction thereof. Accordingly, the mixed slurry can be dispersed widely and leaked from the upper space 24b to the lower space 25b by way of the small diameter through holes 27c.

In the opening at the top of the stirring-mixing-filtering bath 2, five spraying pipes 14 through 18 are disposed concentrically in a horizontal plane. The spraying pipes 14 through 18 are formed in a circle shape around the rotary shaft 28 taken as the center, and communicated with an outlet port of the opening-closing valves V1 through V5 respectively. Further, a plurality of spraying bores 19 are drilled through the bottom surface of the spraying pipes 14 through 18.

The microcomputer control device 9 comprises a microcomputer, and controls to open and close the opening closing valves V1 through V5, thereby adjusting the composition of the mixed slurry in the stirring-mixing-filtering bath 2.

The raw material powders to be supplied into the slurry preparing baths 1a through 1e comprise silicon carbide (SiC) powder having the average particle diameter of approximately 2 μm and titanium (Ti) powder having the average particle diameter of approximately 40 μm. The SiC powder and the Ti powder are mixed in different mixing rates for each of the slurry preparing baths 1a through 1e. Namely, the raw material powder to be supplied into the slurry preparing bath 1a is prepared so as to comprise 100% by weight of the SiC powder, the raw material powder to be supplied into the slurry preparing bath 1b is prepared so as to comprise 75% by weight of the SiC powder and 25% by weight of the Ti powder, the raw material powder to be supplied into the slurry preparing bath 1c is prepared so as to comprise 50% by weight of the SiC powder and 50% by weight of the Ti powder, the raw material powder to be supplied into the slurry preparing bath 1d is prepared so as to comprise 25% by weight of the SiC powder and 75% by weight of the Ti powder, and the raw material powder to be supplied into the slurry preparing bath 1e is prepared so as to comprise 100% by weight of the Ti powder. In the slurry preparing baths 1a through 1e, the stirrers 12 are rotated in order to stir the raw material powders and water, thereby preparing five kinds of the slurries "A" through "E".

Figure 12:
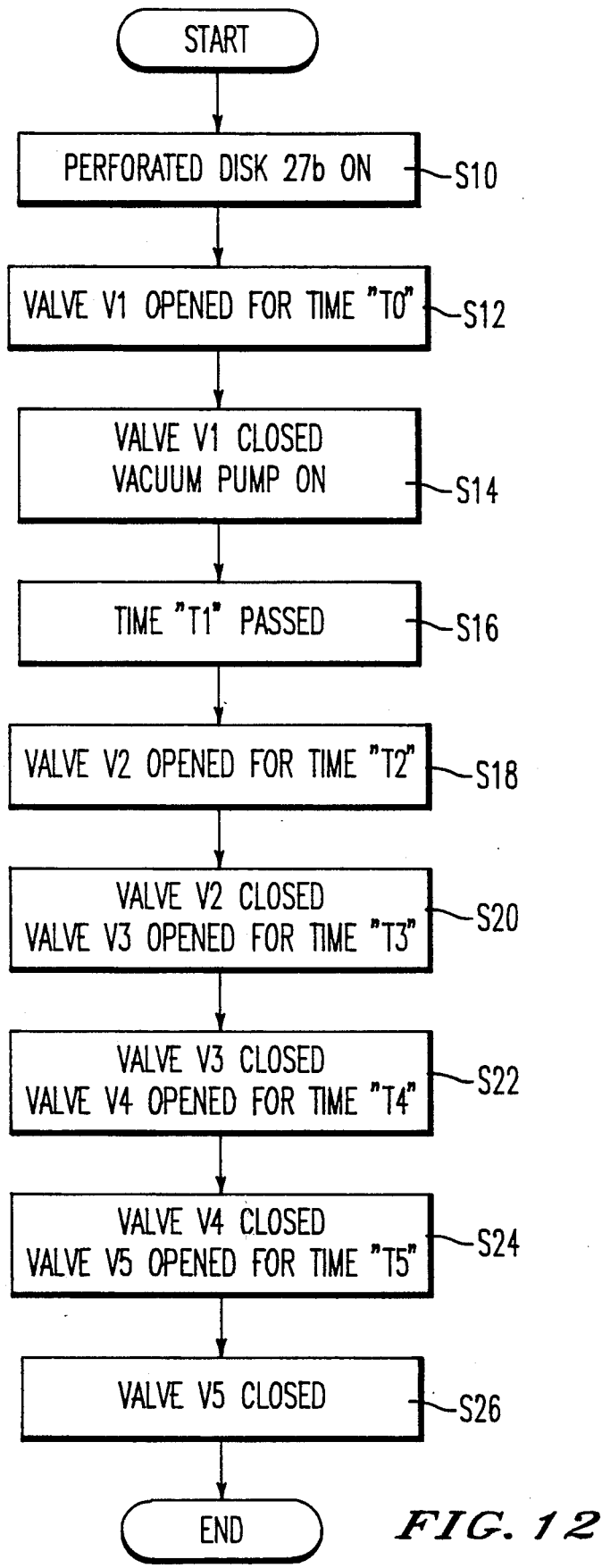
FIG. 12 is a flow chart for describing the operation of the laminating apparatus illustrated in FIG. 11.

A process for laminating a functionally gradient material layer of the fourth preferred embodiment according to the present invention, in which the laminating apparatus thus arranged was employed, will be hereinafter described with reference to the flow chart illustrated in FIG. 12.

At step "S10", the perforated disk 27b was rotated gently at the speed of 60 rpm.

At step "S12", the opening-closing valve V1 was opened to supply the slurry "A" into the stirring-mixing-filtering bath 1 by a constant flow rate for a predetermined time "T0". As a result, the slurry "A" is leaked from the upper space 24b to the lower space 25b by way of the small diameter through holes 27c of the perforated disk 27.

At step "S14", the opening-closing valve V1 was closed, and the vacuum pump (not shown) was turned on. As a result, the raw material powder in the slurry "A" introduced into the stirring-mixing-filtering bath 2 was dehydrated by gravity and by the vacuum pump, and sedimented on the top surface of the filter member 21, thereby forming a cake 5.

At step "S18", after a predetermined time "T1" had passed (step "S16"), namely when the cake 5 sedimented on the top surface of the filter member 21 was assumed to reach a predetermined thickness, the opening-closing valve V2 was opened in order to introduce the slurry "B" into the stirring-mixing-filtering bath 2 by a constant flow rate. As a result, the composition of the mixed slurry in the stirring-mixing-filtering bath 2 varied rapidly in the upper space 24b, however, the composition of the mixed slurry varied rather slowly in the lower space 25b. The composition of the newly formed portion of the cake 5 was effected to slope in accordance with the slow composition variation.

At step "S20", after a predetermined time "T2" had passed, the opening-closing valve V2 was closed, and the opening-closing valve V3 was opened in order to introduce the slurry "C" into the stirring-mixing-filtering bath 2 by a constant flow rate.

At step "S22", after a predetermined time "T3" had passed, the opening-closing valve V3 was closed, and the opening-closing valve V4 was opened in order to introduce the slurry "D" into the stirring-mixing-filtering bath 2 by a constant flow rate.

At step "S24", after a predetermined time "T4" had passed, the opening-closing valve V4 was closed, and the opening-closing valve V5 was opened in order to introduce the slurry "E" into the stirring-mixing-filtering bath 2 by a constant flow rate.

Figure 13:
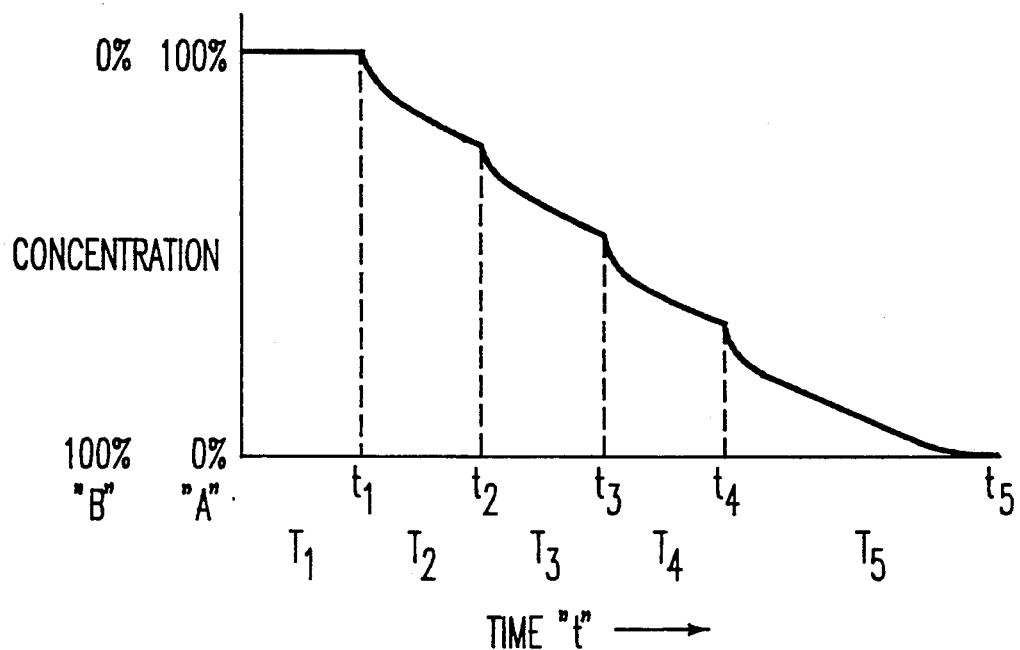
FIG. 13 is a diagram of a composition variation in a slurry in a stirring-mixing-filtering bath 2 of the laminating apparatus illustrated in FIG. 11.
Figure 14:
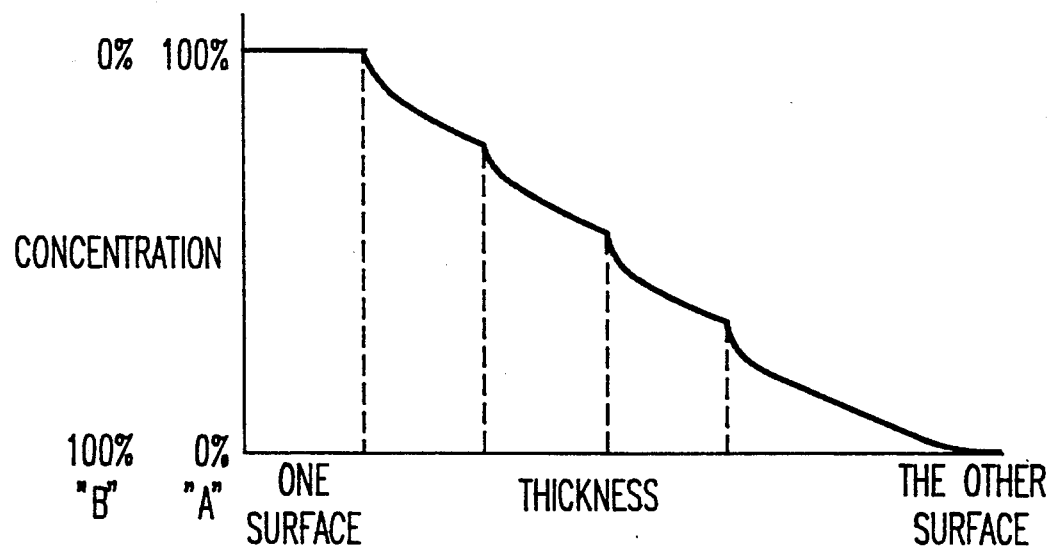
FIG. 14 is a diagram of a composition variation in a cake in the thicknesswise direction thereof laminated by the process for laminating a functionally gradient material of the fourth preferred embodiment according to the present invention.

In this way, the composition of the lower space 24b varied as illustrated in FIG. 13, and the composition of the cake 5 varied in the thicknesswise direction thereof in accordance therewith as illustrated in FIG. 14.

Finally, at step "S26", after a predetermined time "T5" had passed, the opening-closing valve V5 was closed, and thereafter the vacuum pump (not shown) and the perforated disk 27b were turned off when the mixed slurry in the stirring-mixing-filtering bath 2 was dehydrated almost completely. The process for laminating the functionally gradient material had been thus completed.

Thereafter, the perforated disk 27b was removed, and a compression piston (not shown) was inserted into and descended in the stirring-mixing-filtering bath 2 from the top, thereby gently dehydrating the cake 5. The cake 5 was then taken out of the stirring-mixing-filtering bath 2, molded into a predetermined configuration, dried and sintered.

FIG. 14 illustrates the composition variation of the cake 5 in the thicknesswise direction thereof. It is apparent from FIG. 14 that the cake 5 thus obtained had a relatively smooth gradient. Especially, in the fourth preferred embodiment, it is easy to make the composition uniform in the planewise direction of the cake 5, since the mixed slurry was supplied from the upper space 24b to the lower space 25b while gently stirring the mixed slurry with the perforated disk 27b.

FIFTH PREFERRED EMBODIMENT

The fifth preferred embodiment of a process for laminating a functionally gradient material according to the present invention will be hereinafter described. The fifth preferred embodiment is a modified embodiment of the above-mentioned fourth preferred embodiment.

Figures 15, 16:
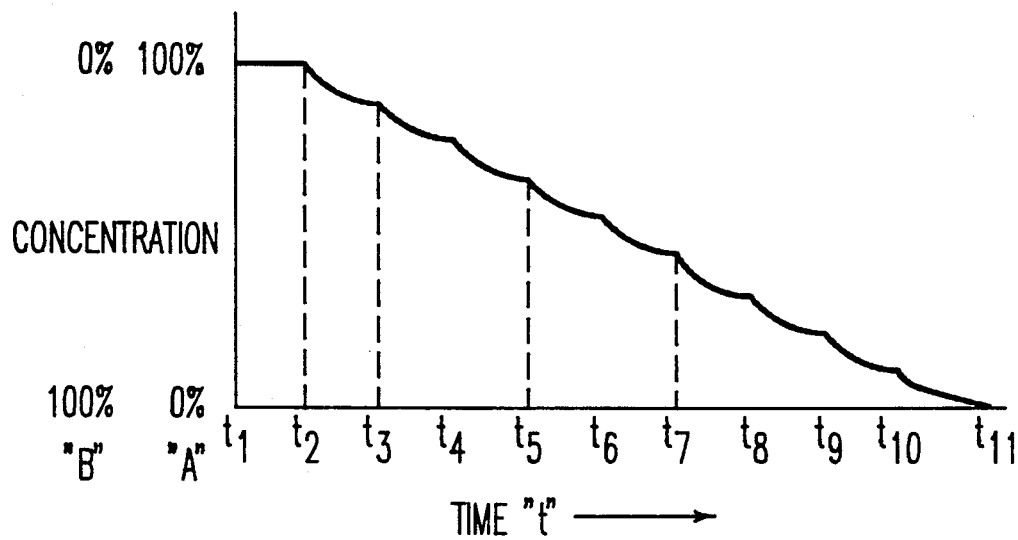
FIG. 15 is a diagram of a concentration variation of a mixed slurry when ten kinds of slurries are employed in the process therefor of the fourth preferred embodiment according to the present invention.
FIG. 16 is a timing chart illustrating supply timing of the ten kinds of slurries in the process therefor of the fourth preferred embodiment according to the present invention.

Namely, in the fourth preferred embodiment, five kinds of slurries were employed, however, slurries having greater kinds of compositions may be employed, thereby making the composition gradient further continuous in the thicknesswise direction. For instance, when ten kinds of slurries "A" through "J" were employed, the composition of the mixed slurry in the lower space 24b in the stirring-mixing-filtering bath 2 varied as illustrated in FIG. 15, and the ten kinds of the slurries "A" through "J" were supplied in order to effect such a composition variation as illustrated in a timing chart of FIG. 16.

Further, as for the stirring-mixing-filtering bath 2, not only the above-mentioned suction and filtration type filtering bath in which the vacuum pump is employed, but also a pressure filtration type stirring-mixing-filtering bath, a centrifugal filtration type stirring-mixing-filtering bath, a compression separation type stirring-mixing-filtering bath, an electrophoresis stirring-mixing-filtering bath and the like may be employed naturally. The filter member 21 may be formed in a desired product shape as the case requires.

Moreover, the dispersion medium is not limited to water, but the other organic solvents may be employed therefor. The suspension particles may have a form other than a particle, for instance, they may have a whisker-like shape.

Having now fully described the present invention, it will be apparent to one of ordinary skill in the art that many changes and modifications can be made thereto without departing from the spirit or scope of the present invention as set forth herein.

What is claimed is:

1. An apparatus for producing a functionally gradient material product having a layer shape and plural kinds of particles comprising:

a mixing means for stirring and mixing a suspension in which plural kinds of suspension particles are suspended;

a supply controlling means for varying mixing rates of said plural kinds of suspension particles in said suspension gradually along a predetermined curve;

a solid-liquid separation means for making a cake by solid-liquid separation of said suspension, wherein a composing rate of said plural kinds of suspension particles in said cake is gradually varying in the laminating direction; and a drying means for drying said cake in order to eliminate liquid in said cake, thereby solidifying said cake to a predetermined solid shape;

wherein said mixing means is integrally formed at the top of said solid-liquid separation means and a net is disposed between said mixing means and said solid-liquid separation means in order to avoid confused flow of said suspension in said solid-liquid separation means.

2. The apparatus according to claim 1, wherein said supply controlling means controls said mixing rate of one kind of said suspension particles in a range of from more than 90% to less than 10% by weight during a period of forming said cake.

3. The apparatus according to claim 1, wherein said supply controlling means controls said mixing rate of one kind of said suspension particles in a range of less than 10% to more than 90% by weight during a period of forming said cake.

4. An apparatus for producing a functionally gradient material product having a layer shape and plural kinds of particles comprising:

a mixing means for stirring and mixing a suspension in which plural kinds of suspension particles are suspended;

a supply controlling means for varying mixing rates of said plural kinds of suspension particles in said suspension gradually along a predetermined curve;

a solid-liquid separation means for making a cake by solid-liquid separation of said suspension, wherein a composing rate of said plural kinds of suspension particles in said cake is gradually varying in the laminating direction; and a drying means for drying said cake in order to eliminate liquid in said cake, thereby solidifying said cake to a predetermined solid shape;

wherein said mixing means is integrally formed at the top of said solid-liquid separation means having a perforated disk with small diameter through holes for passing said suspension particles.

5. The apparatus according to claim 4, wherein said supply controlling means controls said mixing rate of one kind of said suspension particles in a range of from more than 90% to less than 10% by weight during a period of forming said cake.

6. The apparatus according to claim 4, wherein said supply controlling means controls said mixing rate of one kind of said suspension particles in a range of less than 10% to more than 90% by weight during a period of forming said cake.

* * * * *